United States Patent
Zhong et al.

(10) Patent No.: US 12,095,819 B2
(45) Date of Patent: Sep. 17, 2024

(54) SECURITY BROKER FOR EDGE COMPUTING ENVIRONMENT

(71) Applicant: Dell Products L.P., Round Rock, TX (US)

(72) Inventors: HaiJun Zhong, Shanghai (CN); XiaoJun Wu, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 17/574,232

(22) Filed: Jan. 12, 2022

(65) Prior Publication Data

US 2023/0224332 A1    Jul. 13, 2023

(51) Int. Cl.
H04L 9/40       (2022.01)
G06F 21/62      (2013.01)

(52) U.S. Cl.
CPC .......... *H04L 63/20* (2013.01); *G06F 21/6218* (2013.01); *H04L 63/10* (2013.01)

(58) Field of Classification Search
CPC ..... H04L 63/20; H04L 63/10; H04L 63/0281; H04L 63/0428; G06F 21/6218
See application file for complete search history.

(56) References Cited

U.S. PATENT DOCUMENTS

| | | | |
|---|---|---|---|
| 10,554,418 B2 * | 2/2020 | Kshirsagar | H04L 9/3268 |
| 11,323,325 B1 * | 5/2022 | Hullahalli | H04L 41/40 |
| 2004/0196981 A1 * | 10/2004 | Nakano | G06F 21/10 |
| | | | 380/280 |
| 2005/0074126 A1 * | 4/2005 | Stanko | H04L 63/0815 |
| | | | 380/279 |
| 2006/0209868 A1 * | 9/2006 | Callaghan | G06Q 10/00 |
| | | | 370/428 |
| 2007/0005801 A1 * | 1/2007 | Kumar | H04L 63/08 |
| | | | 709/238 |

(Continued)

OTHER PUBLICATIONS

Z. Y. Thean, V. Voon Yap and P. C. Teh, "Container-based MQTT Broker Cluster for Edge Computing," 2019 4th International Conference and Workshops on Recent Advances and Innovations in Engineering (ICRAIE), Kedah, Malaysia, 2019, pp. 1-6 (Year: 2019).*

*Primary Examiner* — Michael R Vaughan
(74) *Attorney, Agent, or Firm* — Jackson Walker L.L.P.

(57) ABSTRACT

A disclosed security broker receives a request message addressed to a message queue associated with an edge resource, identifies the message source, and leverages an authentication module to verify that the source has authorization to access the targeted message queue. The security broker may then deliver the request message to the targeted edge resource message queue. If the edge resource and security broker are physically isolated, the security broker may format the request message as a file, store the file to a storage device, and transfer the storage device to the edge resource, which may then process the file and upload the request message to the edge resource's message queue module. The security broker also monitors a response message from the edge resource, purges sensitive data from the response. If the broker and cloud resource are physically isolated, the response may be formatted and delivered as a file.

16 Claims, 4 Drawing Sheets

(56) References Cited

U.S. PATENT DOCUMENTS

| | | | |
|---|---|---|---|
| 2012/0284507 A1* | 11/2012 | Bostanci | G06F 21/335 |
| | | | 713/155 |
| 2013/0191882 A1* | 7/2013 | Jolfaei | G06F 21/335 |
| | | | 726/4 |
| 2015/0161345 A1* | 6/2015 | Tippett | G16H 10/60 |
| | | | 705/3 |
| 2016/0205071 A1* | 7/2016 | Cooper | H04L 12/6418 |
| | | | 726/1 |
| 2023/0216947 A1* | 7/2023 | Bernardi | H04L 63/10 |
| | | | 713/150 |

\* cited by examiner

SECURITY BROKER FOR EDGE COMPUTING ENVIRONMENT

TECHNICAL FIELD

The present disclosure relates to information handling systems and, more specifically, information handling systems implemented within an edge computing framework.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are implemented as distributed computing systems, in which the system components are located on two or more interconnected but distinct information handling systems. Edge computing is a distributed computing system platform of considerable and increasing commercial significance wherein an emphasis is placed on locating computational and storage resources close to the sources of data, i.e., at the edge, as opposed to, far away, i.e., within cloud-based resources. Because edge computing environments may include a potentially large group of connected and interlinked devices, the edge generally lacks or is unable to leverage the design and well-maintained physical security of data centers or the generally mature, hardware and software based data and network/access security measures applied within data centers.

SUMMARY

Issues associated with ensuring the security of communications between edge and cloud resources within an edge computing environment are addressed by a security broker and method in accordance with disclosed teachings. A disclosed security broker is configured to receive and monitor communications between a cloud resource and an edge resource that may be physically isolated from the cloud resource, the security broker, or both.

With respect to cloud-to-edge data flow, the security broker may receive, from an unknown or unconfirmed cloud resource, a request message containing information indicative of a message queue associated with an edge resource. After identifying a source of the request message, the security broker may leverage an authentication module to authenticate the message source and verify that the source has authorization to access the targeted message queue. As an illustrative example, the security broker may retrieve, from the edge resource, a public key associated with the message queue and employ a PKI decryption algorithm to verify that the source of the received message is authorized to access the message queue edge resource. If the verification is successful, the security broker may then deliver the request message to the targeted edge resource message queue. Otherwise, the security broker prevents the source from accessing the edge resource.

In cases where the edge resource is a physically isolated from the security broker resource including, as a non-limiting example, a dark site data center, the security broker may format the request message as a file in accordance with a known file format supported by the edge resource and transfer the message file to the edge resource. As an example, the security broker may format the incoming message as a File Allocation Table (FAT) 32 (FAT 32) file, store the file on a suitable storage device, and physically transfer the storage device to a file interface of the edge resource, which may then process the message file to extract and forward the request message to a message queue handler. If soft isolation, rather than physical isolation, is used to isolate the edge resource, the security broker may be configured to receive the request on a first connection and forward the message to the edge resource on a second connection.

The security broker is further configured to receive and monitor a response message from the edge resource. The security broker may, as an example, invoke a sensitive data discovery tool to identify sensitive and potentially sensitive information, e.g., personally identifiable information (PII), in the response and to take appropriate action, including deleting or purging the sensitive information from the response message to prevent distribution of the sensitive data beyond the edge. In cases where the security broker is physically isolated from the cloud resource may format the response message as a response message file, store the response message file on a suitable storage device, and deliver to the storage device for processing and uploading of the response message to a message queue module of the cloud resource. In this manner, the security broker may be configured to replicate conventional message queue functionality between physically isolated cloud and/or edge resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
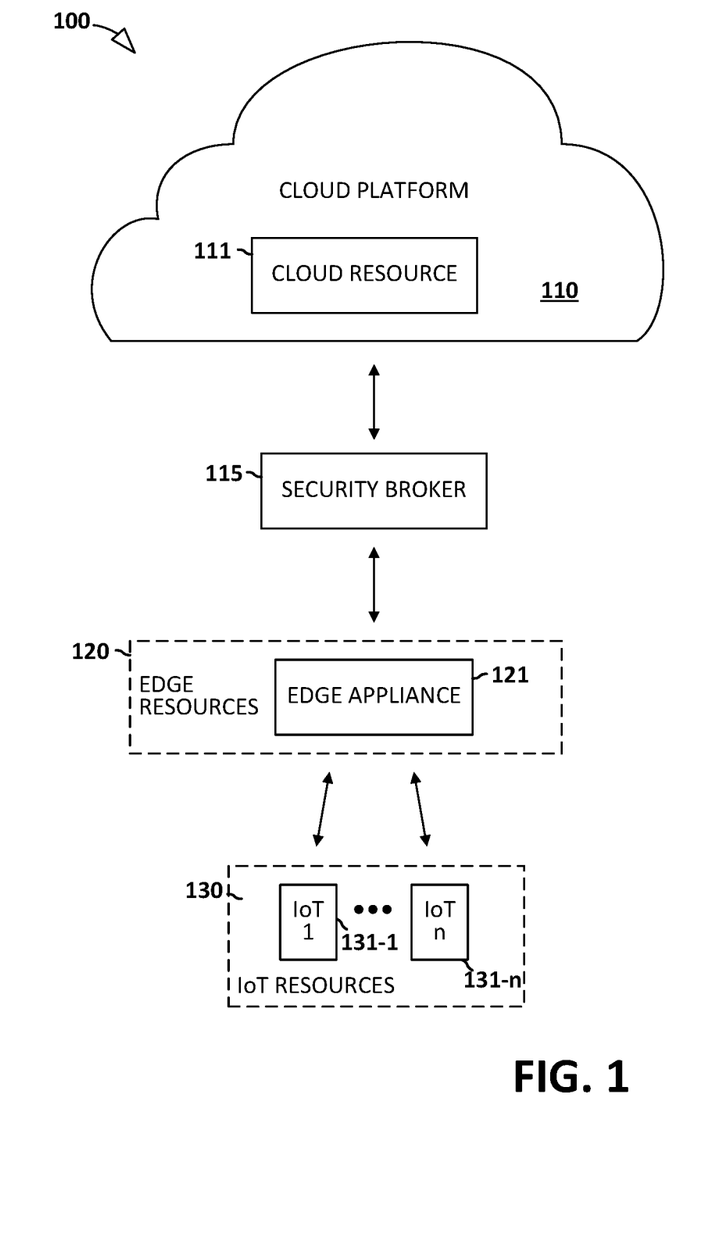
FIG. 1 illustrates an edge computing environment suitable for an IoT solution and including a security broker in accordance with disclosed teachings.

Referring now to the drawings, FIG. 1 illustrates an exemplary edge computing environment 100 in accordance with disclosed teachings for implementing a security broker 115 to monitor messages and other information exchanged between cloud resource 111 and edge appliance 121. Embodiments of the depicted environment 100 include support for edge-isolated implementations, in which security broker 115 is physically isolated from edge appliance 121, and cloud-isolated implementations, in which security broker 115 is physically isolated from cloud resource 111.

The security broker 115 is depicted in FIG. 1 coupled between a cloud platform 110, encompassing one or more virtualized information handling systems and/or resources exemplified by the cloud resource 111 depicted in FIG. 1, and edge resources 120, including the depicted edge appliance 121. The example edge computing environment depicted in FIG. 1 may be referred to as an IoT platform in which IOT resources 130, including IOT devices 131-1 through 103-n, acquire and pass raw data to edge resources 120. Each IOT device 131 may be implemented as a physical device with embedded sensors, hardware and software processing resources, and network interfaces, which, for the sake of clarity, are omitted from FIG. 1.

The IoT platform of FIG. 1 may generally operate as follows. IOT devices 131 report raw data to edge appliance 121, which processes the raw data and uploads information to cloud resource 111 for analysis. To illustrate using a simplified example, each IOT device 131 may periodically measure and report temperature and pressure data associated with an industrial machine. The raw data may be wirelessly transmitted to edge appliance 121 which calculates mean and standard deviation information based on the raw data. The information generated by edge appliance 121 may then be forwarded to cloud resources 111, along with other information such as product yield information, for analysis to recognize historical patterns, correlations, and the like using, in at least some examples, rule-based machine learning algorithms and other forms of artificial intelligence (not explicitly depicted in FIG. 1) for control and forecasting. Although FIG. 1 depicts an IoT platform, it will be appreciated by those of ordinary skill in the field of edge computing solutions, that the illustrated edge computing environment may be implemented in accordance with other edge computing-based platforms.

Features of security broker 115 emphasized herein are primarily concerned with communications between cloud platform 110 and edge resources 120. in at least some embodiments, cloud resource 10011 and edge appliance 121 may communicate with each other using 1 or more message queues.

Figure 2:
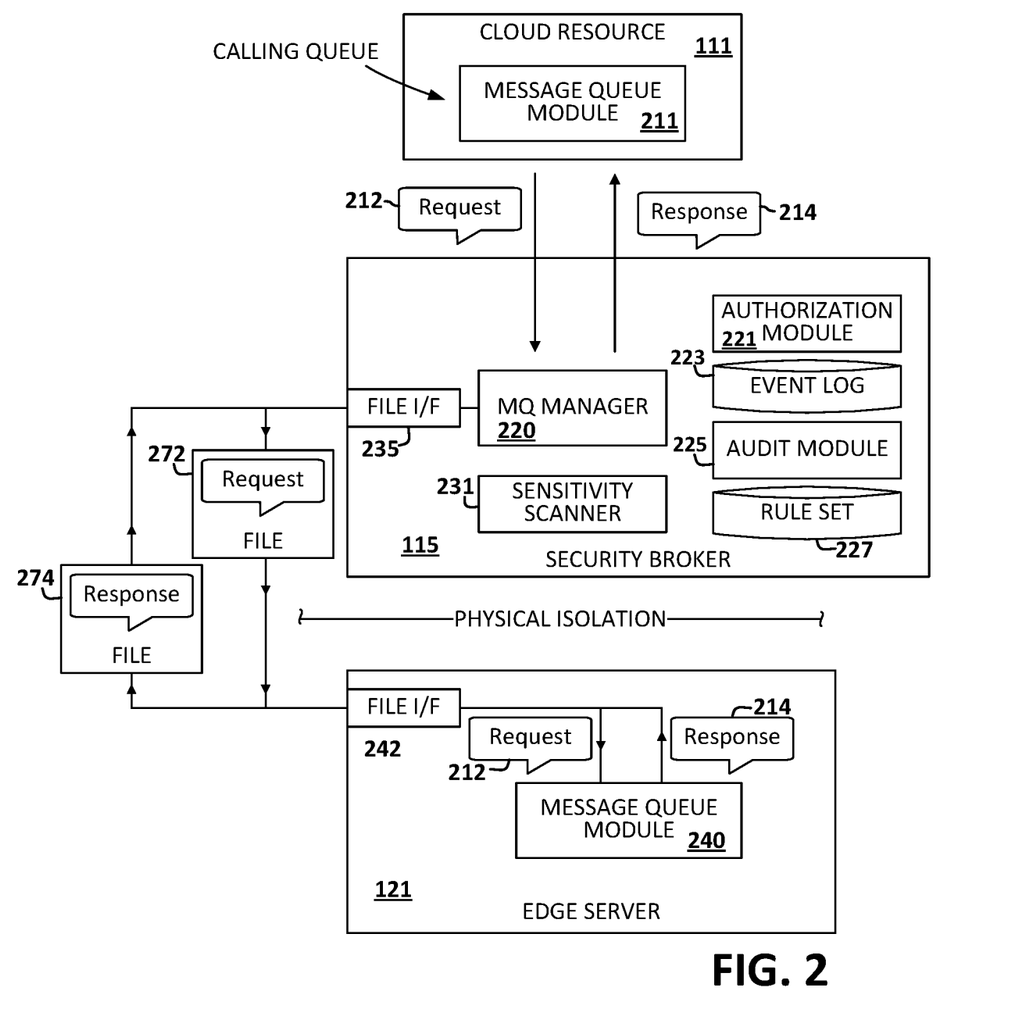
FIG. 2 illustrates a block diagram the security broker of FIG. 1.

FIG. 2 illustrates an exemplary security broker 115 for monitoring messages exchanged between one or more message queues (not explicitly depicted in FIG. 2) established between cloud resource 111 and edge server 121. Cloud resource 111 and edge server 121 may exchange messages using any suitable message queue software including, as a non-limiting example, RabbitMQ from VMware.

The security broker 115 depicted in FIG. 2 includes various modules and data for monitoring and taking appropriate action with respect to communications between edge server 121 and cloud resource 111. The security broker resources explicitly depicted in FIG. 2 include an authorization module 221, and event log 223, an audit module 225, a rule set 227, and a sensitivity scanner 231, all of which are communicatively coupled to MQ manager 220. Authorization module 221 may leverage authorization resources including, as an exemplary authorization technology, public key infrastructure (PKI) resources, to enable and facilitate authentication of incoming messages, i.e., messages from cloud resources 210. Event log 223, as suggested by its name, may serve as a storage resource for enabling MQ manager 220 to store information regarding messages and other transactions. Information that may be stored within event log 223 includes, without limitation, user identification information, date and time records indicating when users interact, terminal identification information, information regarding success or failure of various accesses to systems, applications, and data, information indicating files accessed, networks are accessed, system exceptions raised during monitored transactions, security related events including trigger alarms, and any information pertaining to any intrusion detection or anti-malware notifications. The illustrated rule set 227 may include rules pertaining to particular standards, an example of which might be a rule requiring firmware updates to be implemented within specified number of days of release. The event log 223 may enable audit module 225 to generate audit trails including chronological records of events, thereby permitting an auditor to review compliance with the various certification standards.

The cloud resource 111 of FIG. 2 includes a message queue module 211 that generates and sends a request message 212 addressed to or otherwise intended for edge server 121. In this example, message queue module 211 may be referred to as the calling queue. Security broker 115 may respond to receiving request message 212 by identifying the source of the message and then invoking authorization module 221 to verify that the source of request message 212 is authorized to access the applicable message queue. If the verification is successful, i.e., if the source or request message 212 is authorized to access the message queue, security broker 115 may be configured to forward the message to edge server 121.

The edge server 121, however, is illustrated in FIG. 2 as being physically isolated from security broker 115 and cloud resource 111, i.e., there is no physical network connection between edge server 121 and security broker 115. In this situation, as illustrated in FIG. 2, message queue manager 220 may transform or convert request message 212 to a request file 272 with a standardized file format and deliver the file to the edge appliance using a standardized communication transport such as a universal serial bus (USB) transport. As an example, message queue manager 220 may support any number of standardized file formats including, as examples, file allocation table 32 (FAT32), extended FAT (exFAT), new technology file system (NTFS), and hierarchical file system plus (HFS) plus (HFS+).

In at least one embodiment, delivery of request file 272 from security broker 115 to edge server 121 is accomplished by storing the request file 272 on a portable storage resource such as the non-volatile storage within a USB thumb drive or similar resource.

Upon receiving request message 212, a message queue module 240 in edge server 121 is configured to consume the request message 212 and to generate a response message 214. Again, however, because the edge server 121 is physically isolated from security broker 115, messages queue module 240 may be configured to transform response message 214 to a suitable file format, provide the response file to a file interface 242 and send the response message 214 embedded within response file 274. Upon receiving response file 274, security broker 115 may invoke sensitivity scanner 231 to scan response file 274 for sensitive information such as personally identifiable information (PII). Information not filtered by sensitivity scanner may then be sent to cloud resource 110.

Figure 3:
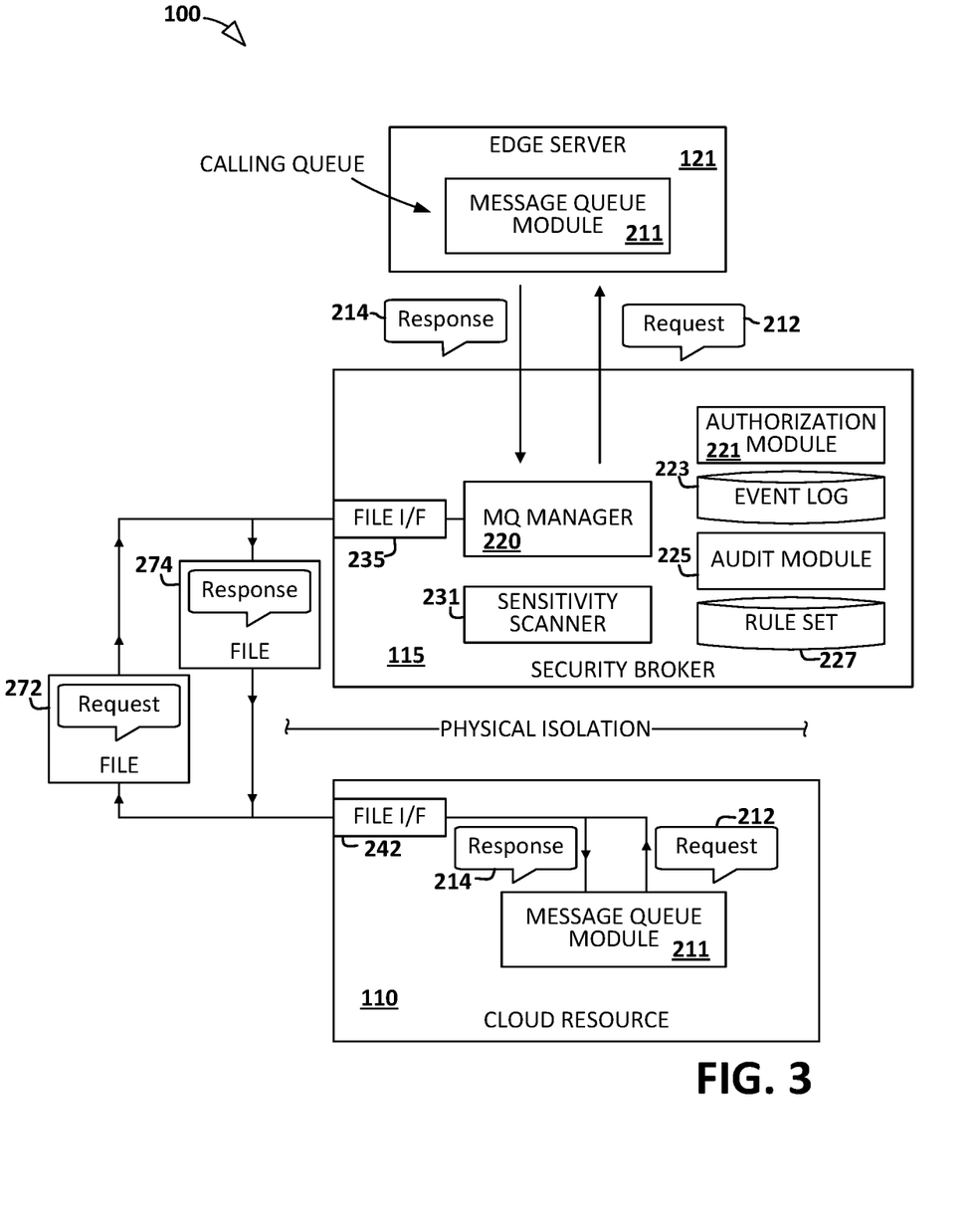
FIG. 3 illustrates a flow diagram of a security broker method.

While FIG. 2 illustrates an implementation in which security broker 115 is physically isolated from edge server 121, FIG. 3 illustrates an embodiment in which security broker 115 is physically isolated from cloud resource 110. In this embodiment, cloud resource 110 may be configured to transform the request message 212 to request file 272 and deliver request file 272 to security broker 115. After verifying the requisite authorization in a manner analogous to the manner in which security broker 115 verified the authority of cloud resource 110 to access the message queue, security broker 115 is configured to pass the request message out to edge server 121. When edge server 121 generates response message 214 and forwards the message to security broker 115, security broker 115 may perform sensitivity scanning on response message 214 and convert the response message 214 to a file format before delivering the response file 274 to cloud resource 110. In this manner, the illustrated security broker 115 supports secure messaging between components in a distributed system despite being physically isolated from either the cloud resource 110 or the edge server 121.

In at least one embodiment, the security broker 115 is entirely or partially by application layer software such that the underlying messaging infrastructure requires little or no modification. In addition, the security broker 115 enables monitoring and auditing messaging traffic in real time.

Figure 4:
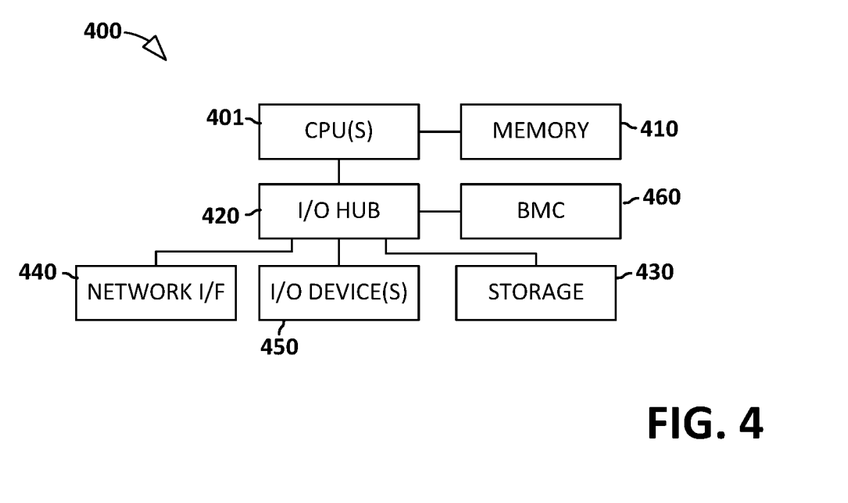
FIG. 4 illustrates an exemplary information handling system.

Referring now to FIG. 4, any one or more of the components illustrated in FIG. 1 and FIG. 2 may implanted as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing security in an edge computing environment, the method comprising:
    receiving, by a security broker, a request message from a cloud platform resource, wherein the request message is addressed to a targeted message queue, wherein the targeted message queue comprises a message queue associated with an edge appliance;
    identifying a source of the request message;
    retrieving, from the edge appliance, a public key of the targeted message queue; and
    determining, based at least in part on the public key of the targeted message queue, whether the source is authorized to access the targeted message queue;
    responsive to determining that the source is authorized to access the targeted message queue, forwarding information indicative of the request message to the edge appliance.

2. The method of claim 1, wherein the security broker is physically isolated from at least one of:
    the cloud platform resource; and
    the edge computing resource.

3. The method of claim 2, wherein forwarding the information indicative of the request message includes:
    formatting the request message as a request message file in accordance with a file format; and
    delivering the request message file to the edge appliance.

4. The method of claim 3, wherein delivering the request message file comprises delivering the request message file via a universal serial bus (USB) transport and wherein the file format comprises a USB-supported file format.

5. The method of claim 3, further comprising:
    responsive to receiving, from the edge appliance, a response message responsive to the request message:
    scanning the response message for sensitive data; and
    responsive to detecting sensitive data, taking action to prevent distribution of the sensitive data beyond the edge appliance.

6. The method of claim 5, further comprising:
    formatting the response message as a response message file in accordance with the file format; and
    delivering the response message file to the cloud resource.

7. The method of claim 2, wherein the edge appliance comprises a component of a dark site data center.

8. The method of claim 1, wherein the determining includes decrypting, based on the public key of the targeted message queue and a predetermined decryption algorithm, an indicator of the source of the request message.

9. An information handling system, comprising:
    a central processing unit (CPU); and
    a memory or storage resource, communicatively coupled to the CPU, including processor executable instructions, wherein the instructions, when executed by the processor, cause the system to perform security broker operations comprising:
    receiving, by a security broker, a request message from a cloud platform resource, wherein the request message is addressed to a targeted message queue, wherein the targeted message queue comprises a message queue associated with an edge appliance;
    identifying a source of the request message;
    retrieving, from the edge appliance, a public key of the targeted message queue; and
    determining, based at least in part on the public key of the targeted message queue, whether the source is authorized to access the targeted message queue;
    responsive to determining that the source is authorized to access the targeted message queue, forwarding information indicative of the request message to the edge appliance.

10. The information handling system of claim 9, wherein the security broker is physically isolated from at least one of:
    the cloud platform resource; and
    the edge computing resource.

11. The information handling system of claim 10, wherein forwarding the information indicative of the request message includes:
    formatting the request message as a request message file in accordance with a file format; and
    delivering the request message file to the edge appliance.

12. The information handling system of claim 11, wherein delivering the request message file comprises delivering the request message file via a universal serial bus (USB) transport and wherein the file format comprises a USB-supported file format.

13. The information handling system of claim 11, wherein the security broker operations further comprise:
    responsive to receiving, from the edge appliance, a response message responsive to the request message:

scanning the response message for sensitive data; and
responsive to detecting sensitive data, taking action to prevent distribution of the sensitive data beyond the edge appliance.

14. The information handling system of claim 13, wherein the security broker operations further comprise:
formatting the response message as a response message file in accordance with the file format; and
delivering the response message file to the cloud resource.

15. The information handling system of claim 10, wherein the edge appliance comprises a component of a dark site data center.

16. The information handling system of claim 9, wherein the determining includes decrypting, based on the public key of the targeted message queue and a predetermined decryption algorithm, an indicator of the source of the request message.

\* \* \* \* \*